United States Patent [19]
Dauvergne

[11] Patent Number: 5,356,337
[45] Date of Patent: Oct. 18, 1994

[54] VENTILATING AND TRACTION MOTOR COOLING APPARATUS FOR AN ELECTRIC VEHICLE

[75] Inventor: Jean Dauvergne, Fosses, France

[73] Assignee: Valeo Thermique Habitacle, Le Mesnil Saint-Denis, France

[21] Appl. No.: 130,103

[22] Filed: Sep. 30, 1993

[30] Foreign Application Priority Data

Oct. 2, 1992 [FR] France ................. 92 11681

[51] Int. Cl.⁵ ............................................ B60H 1/24
[52] U.S. Cl. .............................. 454/156; 454/139; 454/148; 454/159; 454/160; 237/12.3 A
[58] Field of Search ............... 454/139, 143, 146, 148, 454/156, 159, 160, 161

[56] References Cited

U.S. PATENT DOCUMENTS

| | | | |
|---|---|---|---|
| 4,108,376 | 8/1978 | Matsuda et al. | 454/156 |
| 4,340,112 | 7/1982 | Sutoh et al. | 454/156 |
| 4,593,852 | 6/1986 | Tajima et al. | 237/12.3 A |
| 4,722,265 | 2/1988 | Koukal et al. | 454/156 |
| 5,115,727 | 5/1992 | Becquerel . | |
| 5,280,852 | 1/1994 | Dauvergne | 454/139 |

FOREIGN PATENT DOCUMENTS

| | | |
|---|---|---|
| 0467751 | 1/1992 | European Pat. Off. . |
| 0497639 | 8/1992 | European Pat. Off. . |
| 0504653 | 9/1992 | European Pat. Off. . |
| 9202466 | 5/1992 | Fed. Rep. of Germany . |

Primary Examiner—Henry C. Yuen
Attorney, Agent, or Firm—Richard K. Warther

[57] ABSTRACT

An electric vehicle has a traction motor and apparatus comprising an air circuit for cooling the traction motor, for providing heat, where required, for the cabin of the vehicle, and for ventilating the cabin. The air circuit of the apparatus comprises a main branch containing a main ventilating and heating blower, together with a secondary branch which is branched from the first branch and which contains the cooling radiator for the traction motor. An auxiliary blower is arranged in the secondary branch. An upstream mixing valve and a downstream mixing valve connect these two branches in parallel, in such a way that either: the flow of cabin heating air passes through the radiator; or the mixing valves isolate the secondary branch, so as to form an entirely separate cooling air circuit in which the air flow is produced by the auxiliary blower.

5 Claims, 2 Drawing Sheets

VENTILATING AND TRACTION MOTOR COOLING APPARATUS FOR AN ELECTRIC VEHICLE

FIELD OF THE INVENTION

This invention relates to apparatus for cooling the traction and/or propulsion motor, and for the heating and/or ventilation, or air conditioning, of the cabin of a vehicle, comprising: a radiator for cooling the motor and for heating the cabin; a main blower for producing a current of ventilating air drawn from within the cabin and/or from outside; an air inlet regulating means for varying between 0 and 100% a first ratio between the air flow drawn from outside the vehicle and the total air flow produced by the main blower; and mixing means for varying from 0 to 100% a second ratio representing the fraction of air flow coming into contact with a heat source with respect to the air flow delivered into the cabin.

BACKGROUND OF THE INVENTION

In such an apparatus, which is used in particular in an electrically propelled vehicle, the said heat source comprises an auxiliary heat source which may for example be electric. This is put into service when the heat given off by the electric traction motor and its associated equipment is not enough to provide the required heating for the cabin.

DISCUSSION OF THE INVENTION

An object of the invention is to provide an apparatus whereby, in the absence of any requirement for heating of the cabin, cooling of the traction motor can be obtained without any influence on the ventilating or air conditioning circuit for the cabin.

According to the invention, apparatus for cooling the traction and/or propulsion motor, and for the heating and/or ventilation, or air conditioning, of the cabin of a vehicle, comprising: a radiator for cooling the motor and for heating the cabin; a main blower for producing a current of ventilating air drawn from within the cabin and/or from outside; an air inlet regulating means, for varying between 0 and 100% a first ratio between the air flow drawn from outside the vehicle and the total air flow produced by the main blower; and mixing means for varying from 0 to 100% a second ratio representing the fraction of air flow coming into contact with a heat source with respect to the air flow delivered into the cabin, is characterised in that:

(a) the air inlet regulating means is arranged upstream of the main blower,
(b) the said heat source comprises the cooling radiator, and
(c) the cooling radiator is disposed in a secondary branch of the air circuit, which is branched from a main branch and which is in series with the main blower, with the secondary branch also containing an auxiliary blower and being connected directly to the environment outside the cabin through an air inlet port and an air outlet port, which are situated respectively upstream and downstream of the cooling radiator and auxiliary blower, the said mixing means comprising an upstream mixing member and a downstream mixing member, each of which is adapted to be displaced between a first position and a second position, such that in the first position it obturates the corresponding junction between the said main branch and secondary branch, and in the second position it obturates the fresh air inlet port or the external outlet port of the secondary branch.

The preferred features listed below are complementary or alternative to each other in the apparatus for a vehicle according to the present invention.

According to one preferred feature of the invention, the apparatus includes an auxiliary heat source which can be brought into use when the heat flow transmitted from the cooling radiator to the air is insufficient for heating the cabin.

According to another preferred feature of the invention, the said main branch comprises two parallel sub-branches, namely a first said sub-branch containing the said auxiliary heat source, and a second subbranch, the two said sub-branches being disposed in series with the main blower, with means being provided for causing the fraction of the air flow passing through the first sub-branch to be varied with respect to the total air flow in both sub-branches.

The said auxiliary heat source is preferably an electric radiator.

According to a further preferred feature of the invention, the upstream mixing member and the downstream mixing member are arranged to be controlled together, so as to be movable simultaneously between their said first and second positions.

Further features and advantages of the invention will appear more clearly after a reading of the detailed description of a preferred embodiment of the invention which follows, and which is given by way of example only and with reference to the accompanying drawings.

DESCRIPTION OF A PREFERRED EMBODIMENT OF THE INVENTION

Figure 1:
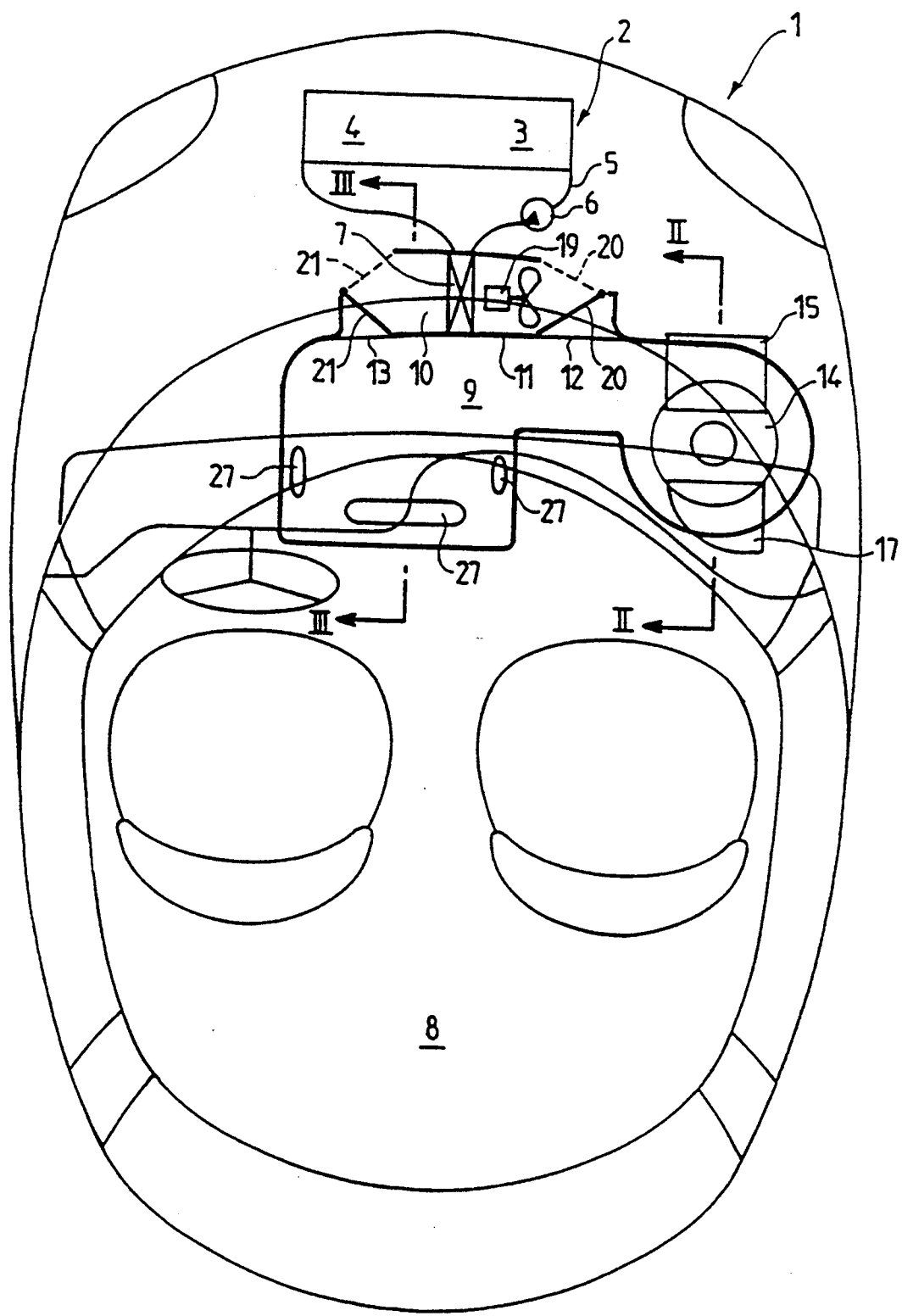
FIG. 1 is a diagrammatic top plan view of an electrically propelled motor vehicle, showing the configuration and location of the air circuit of an apparatus in accordance with the invention.

The vehicle 1 shown in FIG. 1 is equipped with a drive train 2 which comprises an electric motor 3 and a power regulator 4. About 5% of the power which is consumed by the drive train 2 is dissipated in the form of heat by the motor 3, while about 10% is dissipated by the regulator 4. These heat losses are evacuated through a hot water loop 5 which is provided with a circulating pump 6 and a cooling radiator 7.

Figure 2:
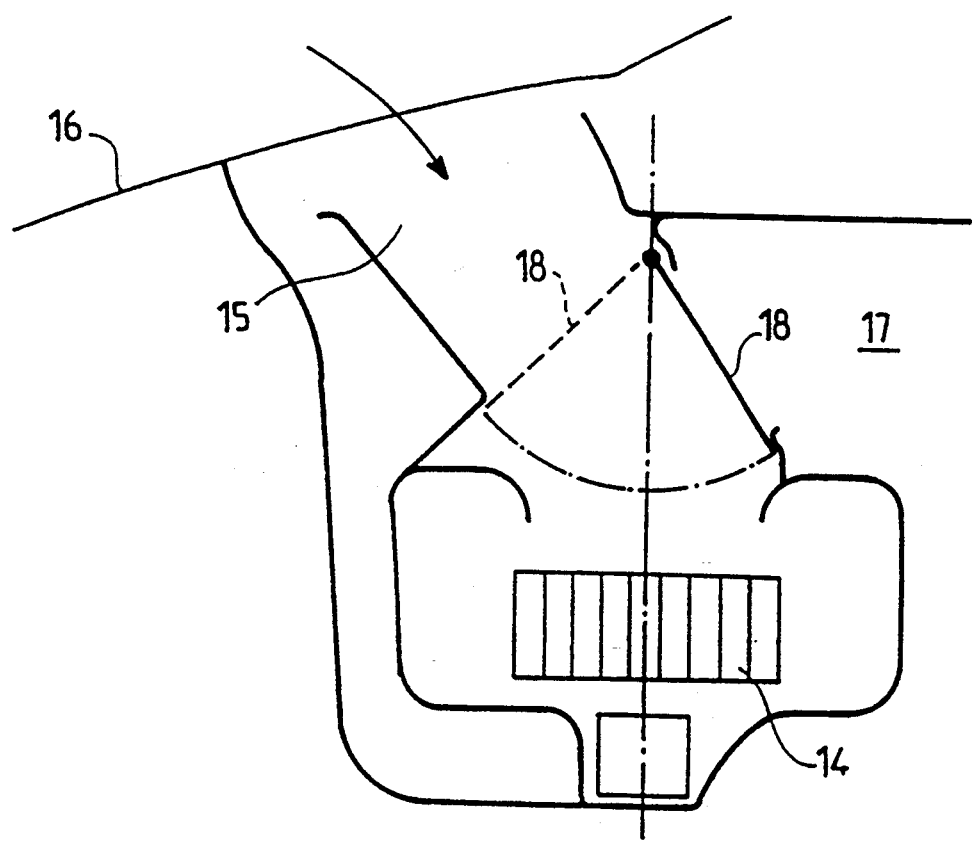
FIG. 2 is a view of the same circuit in diagrammatic cross section, taken on the line II—II in FIG. 1.

The heating and ventilating circuit for the cabin 8 of the vehicle comprises a main branch 6 and a secondary branch 10, the latter being branched off the main branch 9. These two branches are separated from each other by a bulkhead 11, and they communicate together through two apertures 12 and 13 which lie respectively upstream and downstream of the bulkhead 11 (considered in relation to the direction in which the air flows in the branch 9). The branch 9 contains, upstream of the aperture 12, a blower 14 which is arranged to produce a stream of heating or ventilating air for the cabin. Upstream of the blower 14, the branch 9 is in communication with the outside of the cabin through a fresh air inlet port 15 which is arranged below the hood 16 (FIG. 2) of the vehicle. The branch 9 is in communication with the interior of the cabin through a recirculating air inlet port 17. A recirculation valve 18 (FIG. 2) is arranged to pivot between a first position indicated in full lines in FIG. 2, in which it obturates the inlet port 17, and a second position, which is indicated in broken lines, and in which it obturates the inlet port 15. In this way the fraction of the total flow of air produced by the blower which consists of recirculated air is regulated in a continuous way.

The cooling radiator 7 is arranged in the secondary branch 10 in series with an auxiliary blower 19. An upstream mixing valve 20 and a downstream mixing valve 21 may be displaced together between a first position shown in full lines in FIG. 1, in which they obturate the apertures 12 and 13 respectively, and a second position (shown in broken lines), in which they obturate, respectively, an inlet port and an outlet port which give direct communication between the branch 10 and the environment outside the cabin.

Figure 3:
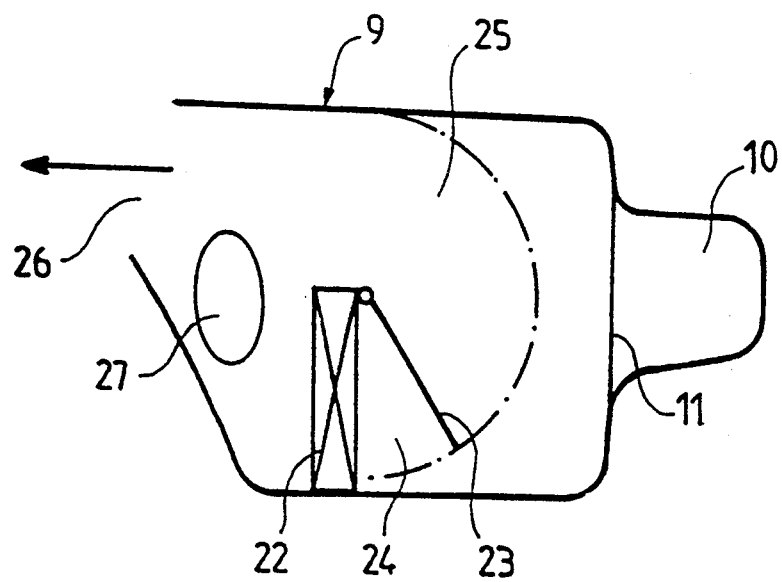
FIG. 3 is a view of the same circuit in diagrammatic cross section, taken on the line III—III in FIG. 1.

An auxiliary radiator 22 (see FIG. 3) is arranged in the branch 9 downstream of the intercommunication aperture 13. The purpose of the auxiliary radiator 22 is to produce additional heat when the heat flow emitted by the drive train is not large enough to satisfy the heating requirements in the cabin. The auxiliary radiator 22 is associated with an auxiliary mixing valve 23, which operates in a known manner to define, within the branch 9, two parallel sub-branches 24 and 25 having variable complementary cross-sections. When the flap valve 23 executes a pivoting movement, the fraction of the air stream which is flowing in the branch 9 and which comes in contact with the auxiliary radiator 22 varies from 0 to 100%. Downstream of the sub-branches 24 and 25, the branch 9 is in communication with the interior of the cabin through outlet vents 26 towards the fascia, outlet vents 27 towards the bottom of the cabin, and further outlet vents, not shown, which are directed towards the base of the windshield.

When it is required to use all of the heat given off by the radiator 7 for heating the cabin, the mixing valves 20 and 21 are adjusted in such a way that the intercommunication apertures 12 and 13 are left completely free, while the direct inlet and outlet ports of the branch 10 are covered. If necessary, a complementary heat flow is obtained by putting the auxiliary radiator 22 into use, and by adjusting the auxiliary mixing valve 23 into the appropriate position.

If there is no requirement for heating the cabin, the valves 20 and 21 are so set that they cover the apertures 12 and 73. The branch 10 then constitutes a cooling air circuit for the traction motor which is entirely independent of the cabin ventilating circuit. The elements of the cabin ventilating circuit may then be adjusted simply in accordance with the ventilation requirements, without being dependent on the traction motor cooling function.

Finally, when the heat flow which is required for heating the cabin is greater than 0 but smaller than the flow produced by the radiator 7, the valves 20 and 21 are set into intermediate positions such as to give partial communication between two branches 9 and 10.

The auxiliary blower 19 gives an air flow which is sufficiently large to pass through the radiator 7 . regardless of the settings of the mixing valves 20 and 21 .

The apparatus described above can be adapted for air conditioning of the vehicle, with a refrigerant fluid evaporator then being provided in the main branch 9 of the air circuit.

What is claimed is:

1. An electrically propelled vehicle having a traction motor, a cabin, and apparatus associated with the traction motor and the cabin, for cooling the traction motor and for at least one function associated with the cabins elected from heating, ventilating and air conditioning, the apparatus comprising: a cooling radiator associated with the traction motor for cooling the traction motor and with the cabin for heating the cabin; duct means associated with the cooling radiator and cabin for flow of air through the duct means; a main blower in the duct means for drawing air selectively from the cabin and from outside the vehicle and for producing a flow of ventilating air; and air inlet regulating means for varying between 0 and 100% a first ratio between the flow of air drawn from outside the vehicle and the total air flow produced by the main blower, the apparatus further including a heat source and mixing means for varying from 0 to 100% a second ratio between the fraction of the air flow drawn from contact with the heat source and the air flow delivered into the cabin, wherein:
   (a) the air inlet regulating means is arranged in the duct means upstream of the main blower,
   (b) the heat source is the cooling radiator, and
   (c) the duct means comprise: a main branch; a secondary branch branched from the main branch and arranged in series with the main blower; a secondary blower arranged int he secondary branch; means defining an air inlet port upstream of the cooling radiator and the auxiliary blower; and means defining an air outlet port arranged downstream of the cooling radiator and the auxiliary blower, the secondary branch being connected through the air inlet and outlet ports with the environment outside the cabin, the mixing means comprising an upstream mixing member and a downstream mixing member, each mixing member being arranged to be displaced between a first position and a second position such that in the first position the corresponding junction between the branches is obturated thereby, and the second position being such that the mixing member concerned obturates a port of the secondary branch selected from its inlet and outlet ports.

2. A vehicle according to claim 1, wherein the apparatus further includes an auxiliary heat source associated with the duct means and arranged to be operative when the heat flow transmitted from the air cooling radiator is insufficient for heating the cabin.

3. A vehicle according to claim 2, wherein the main branch comprises a first sub-branch and a second sub-branch parallel with the first, the auxiliary heat source being arranged in the first sub-branch, both sub-branches being in series with the main blower, the apparatus further including means for varying the fraction of the air flow passing through the first sub-branch with respect to the total flow through both sub-branches.

4. A vehicle according to claim 2, wherein the auxiliary heat source is an electric radiator.

5. A vehicle according to claim 1, wherein the apparatus further includes means for controlling the upstream and downstream mixing members in tandem, whereby they can be adjusted simultaneously between their first and second positions.

* * * * *